United States Patent
Fan et al.

(10) Patent No.: US 12,403,631 B2
(45) Date of Patent: Sep. 2, 2025

(54) CONTINUOUS CARBON FIBER COMPOSITE FILAMENT IMPREGNATION PRETREATMENT DEVICE

(71) Applicant: NANJING UNIVERSITY OF AERONAUTICS AND ASTRONAUTICS, Nanjing (CN)

(72) Inventors: Congze Fan, Nanjing (CN); Yiwei Chen, Nanjing (CN); Zhongde Shan, Nanjing (CN); Jinghua Zheng, Nanjing (CN); Wenzhe Song, Nanjing (CN); Jingxuan Wang, Nanjing (CN); Jiaxun Xu, Nanjing (CN)

(73) Assignee: NANJING UNIVERSITY OF AERONAUTICS AND ASTRONAUTICS, Nanjing (CN)

( * ) Notice: Subject to any disclaimer, the term of this patent is extended or adjusted under 35 U.S.C. 154(b) by 0 days.

(21) Appl. No.: 19/111,329

(22) PCT Filed: Mar. 25, 2024

(86) PCT No.: PCT/CN2024/083445
§ 371 (c)(1),
(2) Date: Mar. 13, 2025

(87) PCT Pub. No.: WO2025/077109
PCT Pub. Date: Apr. 17, 2025

(65) Prior Publication Data
US 2025/0256432 A1     Aug. 14, 2025

(30) Foreign Application Priority Data

Oct. 11, 2023   (CN) .................... 202311310834.8

(51) Int. Cl.
*B05B 13/02* (2006.01)
*B05B 13/04* (2006.01)
(Continued)

(52) U.S. Cl.
CPC ........ *B29B 15/127* (2013.01); *B05B 13/0214* (2013.01); *B05B 13/0436* (2013.01);
(Continued)

(58) Field of Classification Search
None
See application file for complete search history.

(56) References Cited

FOREIGN PATENT DOCUMENTS

| CN | 111186138 A | 5/2020 |
|----|-------------|--------|
| CN | 115351945 A | 11/2022 |

(Continued)

*Primary Examiner* — Binu Thomas
(74) *Attorney, Agent, or Firm* — Bayramoglu Law Offices LLC

(57) ABSTRACT

A continuous carbon fiber composite filament impregnation pretreatment device includes a conveying assembly. The conveying assembly is arranged on a pretreatment device frame. Adhesive layer spray assemblies are provided on left and right sides of the conveying assembly. A plurality of multi-angle cleaning assemblies is sequentially arranged at a front end of the pretreatment device frame. The device overcomes the defects in the impregnation of a continuous fiber reinforced composite filament by pre-treating the surface of the filament and then spraying a thermoplastic adhesive layer onto the fiber surface during the fiber spreading process before impregnation treatment.

8 Claims, 4 Drawing Sheets

(51) Int. Cl.
*B05C 9/10* (2006.01)
*B08B 9/023* (2006.01)
*B29B 13/00* (2006.01)
*B29B 15/12* (2006.01)
*B29B 15/14* (2006.01)

(52) U.S. Cl.
CPC ............... *B05C 9/10* (2013.01); *B08B 9/023* (2013.01); *B29B 13/00* (2013.01); *B29B 15/14* (2013.01)

(56) References Cited

FOREIGN PATENT DOCUMENTS

| | | |
|---|---|---|
| CN | 115890970 A | 4/2023 |
| CN | 117400448 A | 1/2024 |
| EP | 2529918 A2 | 12/2012 |

CONTINUOUS CARBON FIBER COMPOSITE FILAMENT IMPREGNATION PRETREATMENT DEVICE

CROSS REFERENCE TO THE RELATED APPLICATIONS

This application is the national phase entry of International Application No. PCT/CN2024/083445, filed on Mar. 25, 2024, which is based upon and claims priority to Chinese Patent Application No. 202311310834.8, filed on Oct. 11, 2023, the entire contents of which are incorporated herein by reference.

TECHNICAL FIELD

The present invention relates to the field of additive manufacturing devices for composite members, in particular to a continuous carbon fiber composite filament impregnation pretreatment device.

BACKGROUND

Additive manufacturing for composite members is a future development trend. Continuous carbon fiber composite filaments are widely used in 3D printers. By changing the printing direction and printing parameters, printed parts have excellent mechanical properties and a relatively smooth surface. Currently, defects have been found in the impregnation treatment of continuous carbon fiber composite filaments, such as incomplete surface cleaning, unstable fiber spreading, and insufficient impregnation, which affect the properties of the filaments.

SUMMARY

To solve the above problems, the present invention discloses a continuous carbon fiber composite filament impregnation pretreatment device, which overcomes the defects in the impregnation of a continuous fiber reinforced composite filament by pre-treating the surface of the filament and then spraying a thermoplastic adhesive layer onto the fiber surface during the fiber spreading process before impregnation treatment.

A continuous carbon fiber composite filament impregnation pretreatment device includes a conveying assembly, where the conveying assembly is arranged on a pretreatment device frame; an adhesive layer spray assembly is arranged on each of a left side and a right side of the conveying assembly; a plurality of multi-angle cleaning assemblies are sequentially arranged at a front end of the pretreatment device frame.

The present invention is further improved as follows: the conveying assembly includes a support plate and a plurality of conveying rollers fixed on the support plate; a sliding plate is provided at each of upper and lower ends of the support plate; the sliding plate is connected to the pretreatment device frame in a sliding manner.

The present invention is further improved as follows: the lower conveying roller is connected to the sliding plate through an adjusting rod; the adjusting rod is arranged in an adjusting groove of the sliding plate and locked by a bolt. By adjusting the up and down positions of the adjusting rod in the adjusting groove, the height position of the conveying roller can be adjusted to facilitate fiber spreading of carbon fiber composite filaments of different requirements and specifications.

The present invention is further improved as follows: the adhesive layer spray assembly includes spray guns arranged vertically symmetrically, and each spray gun is connected to a lifting cylinder; the lifting cylinder is fixed on an adjusting frame, and each adjusting frame is fixed on the pretreatment device frame.

The present invention is further improved as follows: the spray gun is connected to a cylinder shaft of the lifting cylinder through a connecting plate; a limit rod is provided at each of two ends of the connecting plate; the limit rod is connected to the pretreatment device frame in a sliding manner; a buffer pad adapted to a top of the limit rod is provided on the adjusting frame.

The present invention is further improved as follows: the quantity of the multi-angle cleaning assemblies is even, and the rotation directions of every two adjacent multi-angle cleaning assemblies are opposite; each of the multi-angle cleaning assemblies includes a traveling motor, an inner rotary cleaning ring, an outer traveling track ring, sector-shaped clamping frames, and traveling wheels; an outer circumferential surface of the outer traveling track ring is provided with an outer traveling track; the inner rotary cleaning ring is arranged in a cavity of the outer traveling track ring, and its outer circumferential surface is uniformly provided with a plurality of sector-shaped clamping frames; the outer traveling track ring is fitted into cavities of the sector-shaped clamping frames; the traveling wheels are arranged at two top ends of the sector-shaped clamping frame respectively; each traveling wheel meshes with the outer traveling track; the traveling motor is fixed outside the sector-shaped clamping frames and its output shaft is connected to the traveling wheels; a plurality of cleaning brush fixing plates are uniformly arranged in a cavity of the inner rotary cleaning ring in sequence; a cleaning brush is provided on each cleaning brush fixing plate.

The present invention is further improved as follows: an inner circumferential surface of the outer traveling track ring is provided with an inner traveling track; the outer circumferential surface of the inner rotary cleaning ring is uniformly provided with a plurality of support rods; an auxiliary gear adapted to the inner traveling track is provided on each support rod. During the movement of the inner rotary cleaning ring, the auxiliary gear on the support rod meshes with the inner traveling track to ensure the stability of movement of the inner rotary cleaning ring.

The present invention is further improved as follows: a bottom of the outer traveling track ring is fixed on the pretreatment device frame through a support seat to improve the stability of fixing the outer traveling track ring.

The present invention is further improved as follows: a temperature sensor is arranged at a discharge end of the pretreatment device frame to monitor the temperature of the discharged filament and feed the temperature back to a control terminal in real time, thereby accurately controlling the temperature to adapt to the subsequent impregnation.

The working principle of the present invention is as follows:

1. During the fiber spreading process, a continuous carbon fiber composite filament to be impregnated is sequentially conveyed to the multi-angle cleaning assemblies. During operation, the surface of the conveyed filament is cleaned. The traveling motor drives the traveling wheels to move on the outer traveling track ring. Because the inner rotary cleaning ring is connected to the sector-shaped clamping frames, the inner rotary cleaning ring is driven to rotate 360 degrees. During the filament conveying process, the cleaning brushes clean the surface of the filament. The filament is conveyed horizontally, the quantity of the multi-angle cleaning assemblies is even, and the rotation directions of the two adjacent multi-angle cleaning assemblies are opposite, thereby ensuring that the surface of the filament can be treated in all directions and at multiple angles to remove surface stress, and ensuring that a thermoplastic adhesive layer sprayed by the subsequent adhesive layer spray assemblies can cover the filament uniformly.

2. After cleaning, a thermoplastic adhesive is sprayed by the spray guns on the upper and lower adhesive layer spray assemblies. Because the spray gun is fixed on the connecting plate, the up and down positions of the spray gun are adjusted under the drive of the lifting cylinder, and the distance between the filament and the spray gun is adjusted, to ensure the accuracy of spray. During the movement of the lifting cylinder, the limit rod is limited to ensure the stability of movement of the cylinder shaft. The buffer pad ensures the further stability of up and down movement of the limit rod to prevent the spray gun from shaking.

3. After the adhesive is sprayed once, the spread filament is conveyed by the conveying assembly and then sprayed with the adhesive again to ensure that the surface of the filament is covered with a thermoplastic adhesive layer, which facilitates subsequent full impregnation and improves the bonding between the resin and the fiber surface.

4. The sliding plate on the conveying assembly can adjust the position of the conveying assembly. A plurality of conveying assemblies can be provided subsequently according to the situation for easy processing.

The beneficial effects of the present invention are as follows: Cleaning, thermoplastic application, and conveying are combined together for easy operation. The filament is pre-treated before impregnation, and the thermoplastic adhesive layer is sprayed to the fiber surface during the fiber spreading process, thereby ensuring that the continuous carbon fiber composite filament is impregnated more thoroughly. The degree of impregnation is high, and the bonding between the resin and the fiber surface is improved.

DETAILED DESCRIPTION OF THE EMBODIMENTS

The present invention will be further illustrated below in conjunction with the accompanying drawings and specific embodiments. It should be understood that the following specific embodiments are only used for explaining the present invention, rather than limiting the scope of the present invention. It should be noted that the terms "front", "back", "left", "right", "upper", and "lower" used in the following description refer to the directions in the accompanying drawings, and the terms "inside" and "outside" refer to the directions towards or away from the geometric center of a specific component respectively.

Figure 1:
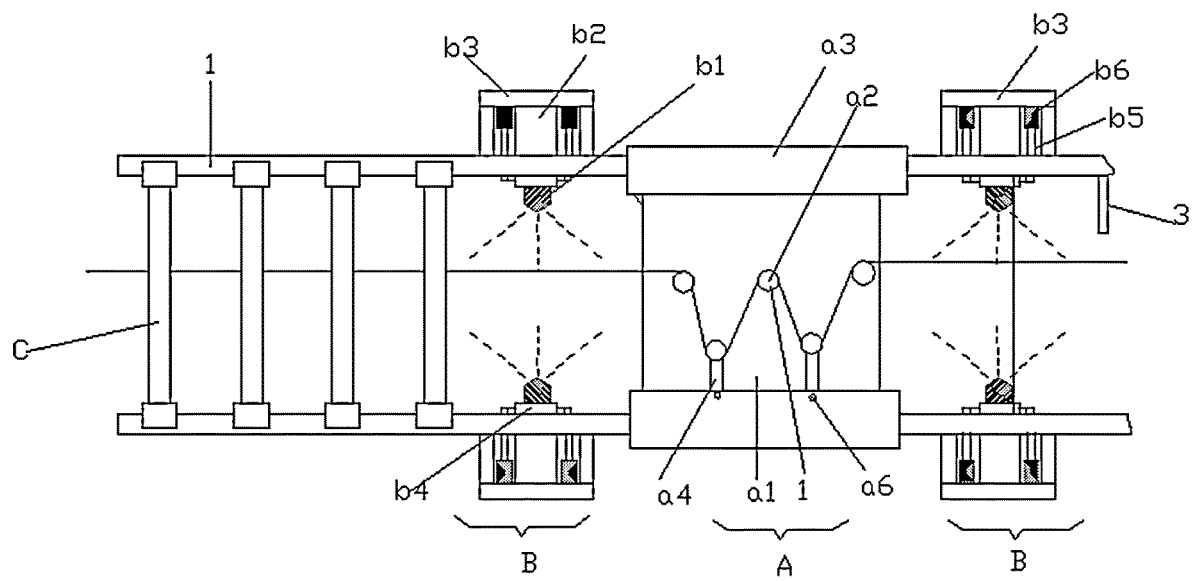
FIG. 1 is a schematic structural diagram of the present invention.
Figure 2:
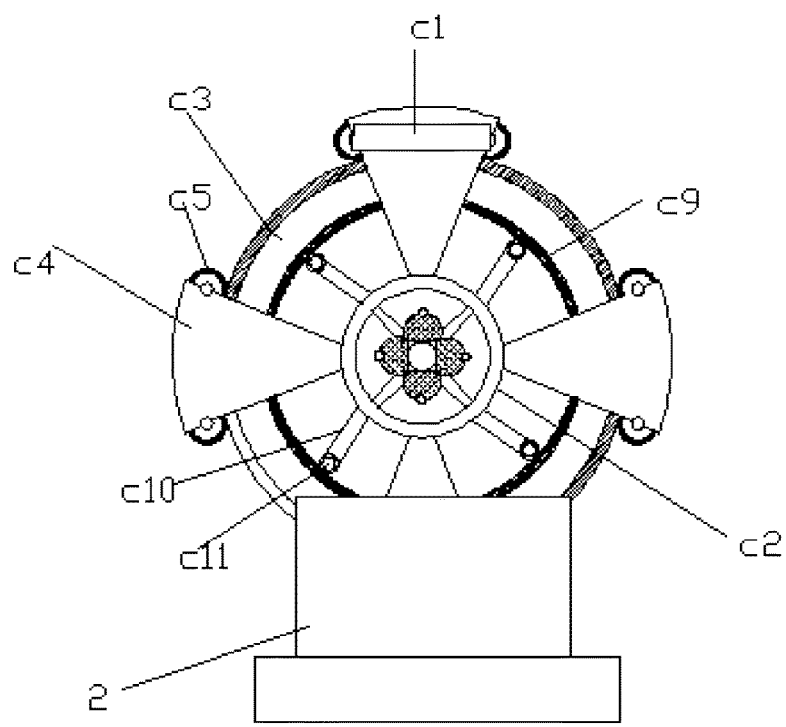
FIG. 2 is a schematic structural diagram of a multi-angle cleaning assembly.
Figure 3:
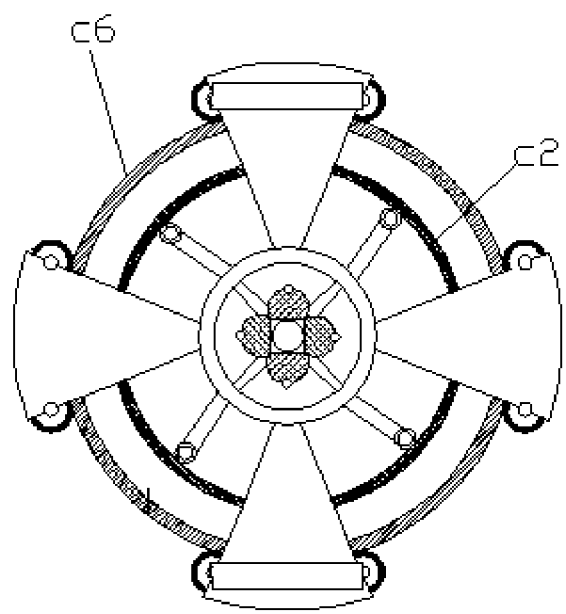
FIG. 3 is a schematic structural diagram of FIG. 2 without a support seat.
Figure 4:
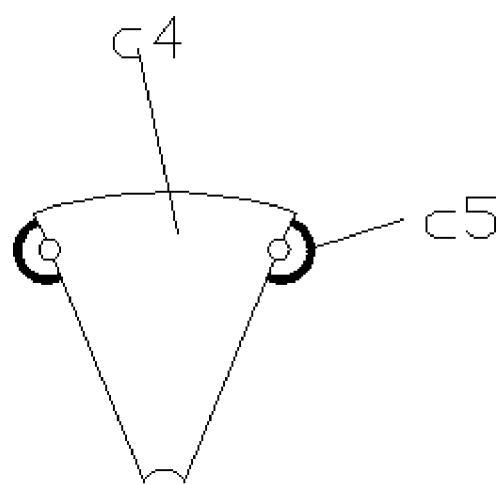
FIG. 4 is a schematic structural diagram of a sector-shaped clamping frame.
Figure 5:
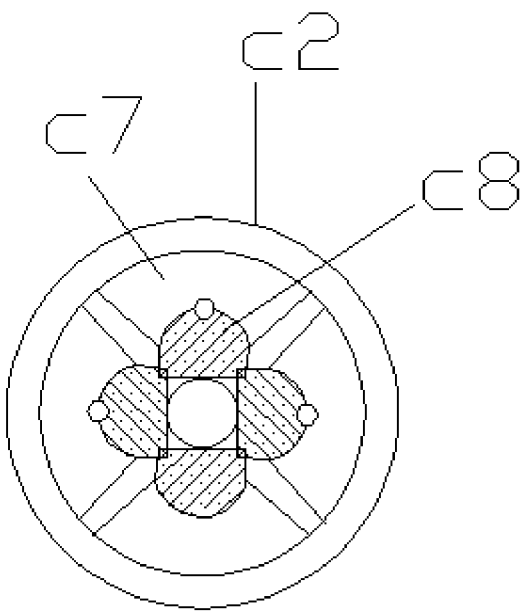
FIG. 5 is a schematic structural diagram of an inner rotary cleaning ring.
Figure 6:
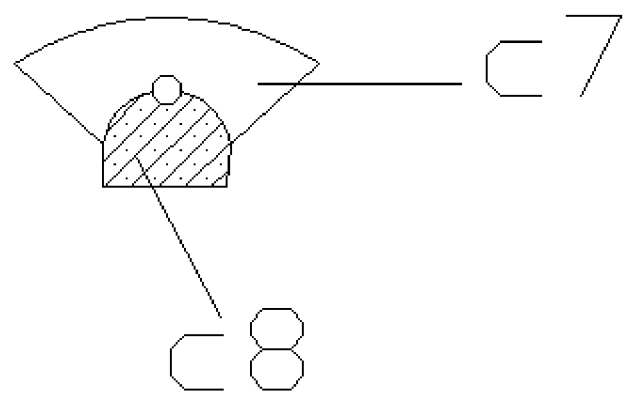
FIG. 6 is a schematic structural diagram of a cleaning brush fixing plate and a cleaning brush connected and fixed.

As shown in FIG. 1, a continuous carbon fiber composite filament impregnation pretreatment device in this embodiment includes a conveying assembly A, where the conveying assembly A is arranged on a pretreatment device frame 1; an adhesive layer spray assembly B is arranged on each of a left side and a right side of the conveying assembly A; a plurality of multi-angle cleaning assemblies C are sequentially arranged at a front end of the pretreatment device frame 1; and a temperature sensor 3 is arranged at a discharge end of the pretreatment device frame 1.

As shown in FIGS. 1-6, the quantity of the multi-angle cleaning assemblies C is even, and the rotation directions of every two adjacent multi-angle cleaning assemblies C are opposite; each of the multi-angle cleaning assemblies C includes a traveling motor $c_1$, an inner rotary cleaning ring $c_2$, an outer traveling track ring $c_3$, sector-shaped clamping frames $c_4$, and traveling wheels $c_5$; a bottom of the outer traveling track ring $c_3$ is fixed on the pretreatment device frame 1 through a support seat 2; an outer circumferential surface of the outer traveling track ring $c_3$ is provided with an outer traveling track $c_6$; the inner rotary cleaning ring $c_2$ is arranged in a cavity of the outer traveling track ring $c_3$, and its outer circumferential surface is uniformly provided with a plurality of sector-shaped clamping frames $c_4$; the outer traveling track ring $c_3$ is fitted into cavities of the sector-shaped clamping frames $c_4$; the traveling wheels $c_5$ are arranged at two top ends of the sector-shaped clamping frame $c_4$ respectively; each traveling wheel $c_5$ meshes with the outer traveling track $c_6$; the traveling motor $c_1$ is fixed outside the sector-shaped clamping frames $c_4$ and its output shaft is connected to the traveling wheels $c_5$; a plurality of cleaning brush fixing plates $c_7$ are uniformly arranged in a cavity of the inner rotary cleaning ring $c_2$ in sequence; a cleaning brush $c_8$ is provided on each cleaning brush fixing plate $c_7$.

An inner circumferential surface of the outer traveling track ring $c_3$ is provided with an inner traveling track $c_9$; the outer circumferential surface of the inner rotary cleaning ring $c_2$ is uniformly provided with a plurality of support rods $c_{10}$; an auxiliary gear $c_{11}$ adapted to the inner traveling track $c_9$ is provided on each support rod $c_{10}$.

During the fiber spreading process, a continuous carbon fiber composite filament to be impregnated is sequentially conveyed to the multi-angle cleaning assemblies C. During operation, the surface of the conveyed filament is cleaned. The traveling motor C1 drives the traveling wheels C5 to move on the outer traveling track ring C3. Because the inner rotary cleaning ring C2 is connected to the sector-shaped clamping frames C4, the inner rotary cleaning ring C2 is driven to rotate 360 degrees. During the filament conveying process, the cleaning brushes C8 clean the surface of the filament. The filament is conveyed horizontally, the quantity of the multi-angle cleaning assemblies C is even, and the rotation directions of the two adjacent multi-angle cleaning assemblies are opposite, thereby ensuring that the surface of the filament can be treated in all directions and at multiple angles to remove surface stress, and ensuring that a thermoplastic adhesive layer sprayed by the subsequent adhesive layer spray assemblies can cover the filament uniformly;

As shown in FIG. 1, the adhesive layer spray assembly B includes spray guns b1 arranged vertically symmetrically, and each spray gun b1 is connected to a lifting cylinder b2; the lifting cylinder b2 is fixed on an adjusting frame b3, and each adjusting frame b3 is fixed on the pretreatment device frame 1; the spray gun b1 is connected to a cylinder shaft of the lifting cylinder b2 through a connecting plate b4; a limit rod b5 is provided at each of two ends of the connecting plate b4; the limit rod b5 is connected to the pretreatment device frame 1 in a sliding manner; a buffer pad b6 adapted to a top of the limit rod b5 is provided on the adjusting frame b3.

After cleaning, a thermoplastic adhesive is sprayed by the spray guns b1 on the upper and lower adhesive layer spray assemblies B. Because the spray gun b1 is fixed on the connecting plate b4, the up and down positions of the spray gun b1 are adjusted under the drive of the lifting cylinder b2, and the distance between the filament and the spray gun b1 is adjusted, to ensure the accuracy of spray. During the movement of the lifting cylinder b2, the limit rod b5 is limited to ensure the stability of movement of the cylinder shaft. The buffer pad b6 ensures the further stability of up and down movement of the limit rod b5 to prevent the spray gun from shaking.

Figure 7:
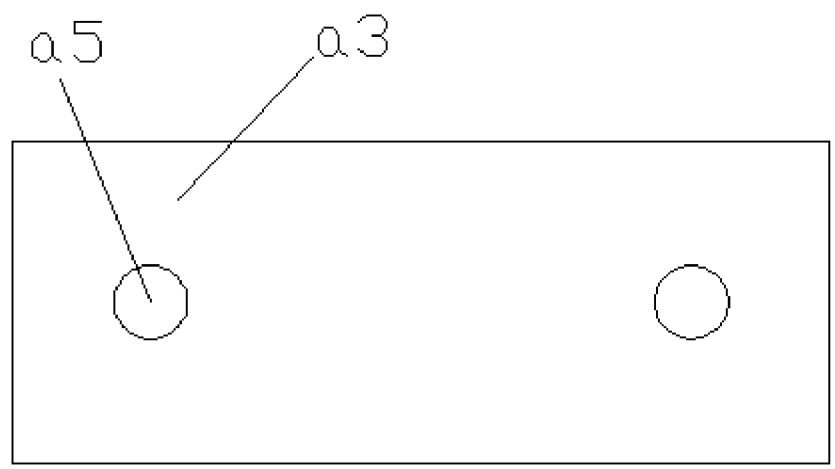
FIG. 7 is a top view of a sliding plate.

As shown in FIGS. 1 and 7, the conveying assembly A includes a support plate a1 and a plurality of conveying rollers a2 fixed on the support plate a1; a sliding plate a3 is provided at each of upper and lower ends of the support plate a1; the sliding plate a3 is connected to the pretreatment device frame 1 in a sliding manner; the lower conveying roller a2 is connected to the sliding plate a3 through an adjusting rod a4; the adjusting rod a4 is arranged in an adjusting groove a5 of the sliding plate a3 and locked by a bolt a6. The sliding plate a3 on the conveying assembly can adjust the position of the conveying assembly A. A plurality of conveying assemblies A can be provided subsequently according to the situation for easy processing. By adjusting the up and down positions of the adjusting rod a4 in the adjusting groove a5, the height position of the conveying roller can be adjusted to facilitate fiber spreading of carbon fiber composite filaments of different requirements and specifications.

After the adhesive is sprayed once, the spread filament is conveyed by the conveying assembly and then sprayed with the adhesive again to ensure that the surface of the filament is covered with a thermoplastic adhesive layer, which facilitates subsequent full impregnation and improves the bonding between the resin and the fiber surface.

In this embodiment, cleaning, thermoplastic application, and conveying are combined together for easy operation. The filament is pre-treated before impregnation, and the thermoplastic adhesive layer is sprayed to the fiber surface during the fiber spreading process, thereby ensuring that the continuous carbon fiber composite filament is impregnated more thoroughly. The thermoplastic resin can be melted at a certain temperature and cooled before plasticizing and crystallizing, has good toughness, and improves the bonding between the resin and the fiber surface.

The technical means disclosed in the solution of the present invention are not limited to the technical means disclosed in the foregoing implementations, but also include technical solutions formed by any combination of the above technical features.

What is claimed is:

1. A continuous carbon fiber composite filament impregnation pretreatment device, comprising a conveying roller assembly, wherein the conveying assembly is arranged on a pretreatment device frame; an adhesive layer spray assembly is arranged on each of a left side and a right side of the conveying assembly; a plurality of multi-angle cleaning assemblies are sequentially arranged at a front end of the pretreatment device frame;

wherein the quantity of the multi-angle cleaning assemblies is even, and rotation directions of every two adjacent multi-angle cleaning assemblies are opposite; each of the multi-angle cleaning assemblies comprises a traveling motor, an inner rotary cleaning ring, an outer traveling track ring, sector-shaped clamping frames, and traveling wheels; an outer circumferential surface of the outer traveling track ring is provided with an outer traveling track; the inner rotary cleaning ring is arranged in a cavity of the outer traveling track ring, and an outer circumferential surface of the inner rotary cleaning ring is uniformly provided with a plurality of sector-shaped clamping frames; the outer traveling track ring is fitted into cavities of the sector-shaped clamping frames; the traveling wheels are arranged at two top ends of the sector-shaped clamping frame respectively; each traveling wheel meshes with the outer traveling track; the traveling motor is fixed outside the sector-shaped clamping frames, and an output shaft of the traveling motor is connected to the traveling wheels; a plurality of cleaning brush fixing plates are uniformly arranged in a cavity of the inner rotary cleaning ring in sequence; and a cleaning brush is provided on each cleaning brush fixing plate.

2. The continuous carbon fiber composite filament impregnation pretreatment device according to claim 1, wherein the conveying assembly comprises a support plate and a plurality of conveying rollers fixed on the support plate; a sliding plate is provided at each of upper and lower ends of the support plate; and the sliding plate is connected to the pretreatment device frame in a sliding manner.

3. The continuous carbon fiber composite filament impregnation pretreatment device according to claim 1, wherein a lower conveying roller is connected to a sliding plate through an adjusting rod; and the adjusting rod is arranged in an adjusting groove of the sliding plate and locked by a bolt.

4. The continuous carbon fiber composite filament impregnation pretreatment device according to claim 1, wherein the adhesive layer spray assembly comprises spray guns arranged vertically symmetrically, and each spray gun is connected to a lifting cylinder; and the lifting cylinder is fixed on an adjusting frame, and each adjusting frame is fixed on the pretreatment device frame.

5. The continuous carbon fiber composite filament impregnation pretreatment device according to claim 4, wherein the spray gun is connected to a cylinder shaft of the lifting cylinder through a connecting plate; a limit rod is provided at each of two ends of the connecting plate; the limit rod is connected to the pretreatment device frame in a sliding manner; and a buffer pad adapted to a top of the limit rod is provided on the adjusting frame.

6. The continuous carbon fiber composite filament impregnation pretreatment device according to claim 1, wherein an inner circumferential surface of the outer traveling track ring is provided with an inner traveling track; the outer circumferential surface of the inner rotary cleaning ring is uniformly provided with a plurality of support rods; and an auxiliary gear adapted to the inner traveling track is provided on each support rod.

7. The continuous carbon fiber composite filament impregnation pretreatment device according to claim 1, wherein a bottom of the outer traveling track ring is fixed on the pretreatment device frame through a support seat.

8. The continuous carbon fiber composite filament impregnation pretreatment device according to claim 1, wherein a temperature sensor is arranged at a discharge end of the pretreatment device frame.

\* \* \* \* \*